June 26, 1962 A. M. SPRINGER 3,041,000
MAGNETIC RECORDING AND PLAYBACK SYSTEMS FOR MAGNETIC TAPE AND MAGNETIC WIRE
Filed April 24, 1961
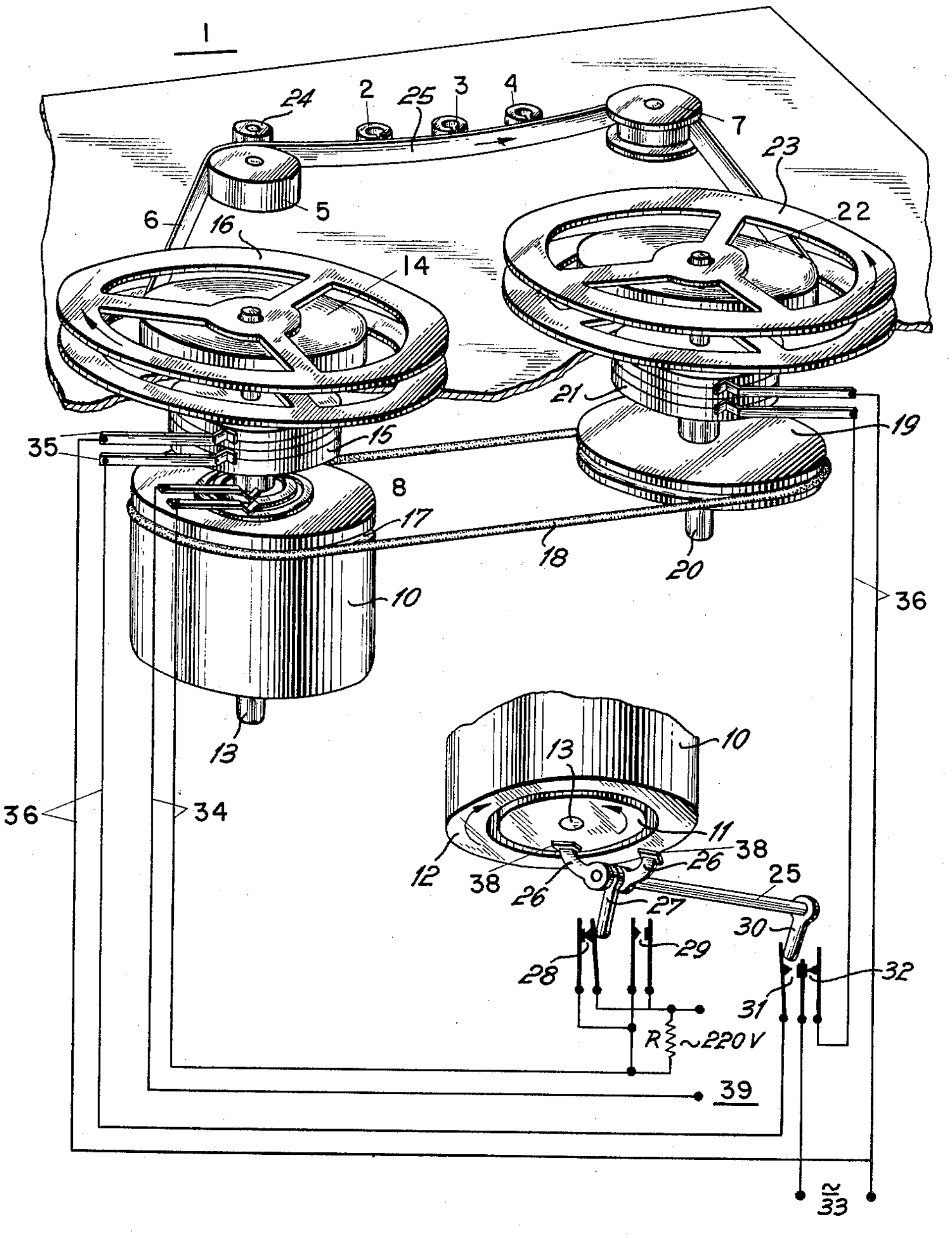
INVENTOR
Anton M. Springer
By [signature] Atty.

United States Patent Office 3,041,000
Patented June 26, 1962

3,041,000

MAGNETIC RECORDING AND PLAYBACK SYSTEMS FOR MAGNETIC TAPE AND MAGNETIC WIRE

Anton M. Springer, Bad Homburg vor der Hoehe, Germany, assignor to Telefonbau und Normalzeit G.m.b.H., Frankfurt, Germany, a firm Filed Apr. 24, 1961, Ser. No. 105,183
5 Claims. (Cl. 242—55.12)

This invention relates generally to magnetic recording and playback systems for magnetic tape and magnetic wire.

From a more limited point of view this invention relates to the parts of such recording and playback systems for operating the supply reel and the take-up reel thereof and for controlling the operation of the two reels.

It is a general object of this invention to provide improved and simplified recording and playback systems for magnetic tape and magnetic wire.

It is another object of this invention to provide simple reel-operating and reel-control means which maintain the magnetic tape or wire, as the case may be, always taut and which lend themselves to rapid rewinding operations.

In recording systems of the kind under consideration tape is wound from a supply reel to a take-up reel. The latter is being driven by a motor and the former is subjected to a slight braking action, thus normally maintaining the tape or wire in a taut condition. However, on instant stopping of the motor drive and of the movement of the recording tape or wire, the supply reel has a tendency to overshoot its position by virtue of the inertia which is inherent in it. This results in the formation of loose loops of tape or wire, tending to impair further recording of sound when the motor is re-started for that purpose. The drawback of loop-formation is particularly serious in playback devices for changing the speed of playback without affecting the pitch of the sounds involved as disclosed in my co-pending patent application Ser. No. 618,766 filed October 29, 1956, now Patent No. 3,022,383 for rotatable Magnetic Systems For Transforming Audio Currents.

It is another object of this invention to provide recording systems of the kind under consideration including simple and inexpensive means for keeping the tape or wire taut, i.e. for avoiding formation of undesirable loops in the same, which means are adapted and lend themselves to high-speed rewinding or unwinding of the tape or wire.

Further objects and advantages of the invention will become apparent as the following description proceeds, and the features of novelty which characterize the invention will be pointed out with particularity in the claims annexed to, and forming part of, this specification.

For a better understanding of the invention reference may be had to the accompanying drawing, the FIGURE being an isometric view of a magnetic tape recorder embodying this invention. The recorder includes an electric motor which has been shown to the left of the drawing as seen from an elevated point of view, and which has been shown to the right of the drawing as seen from a relatively low level, exposing to view that portion of the motor that cannot be seen to the left of the drawing.

In the drawing reference numeral 1 has been applied to indicate a frame structure, e.g. a chassis supporting all the constituent parts of the recorder, or a housing performing the same function. The recorder includes an erase head 2, a recording head 3 and a playback head 4 which may be of conventional design and, therefore, do not need to be described or illustrated in detail. Tape 6 is moved by a capstan 24 driven by a motor which has not been shown in the drawing. Tape 6 is fed into the nip formed between capstan 24 and a roller 5. On its way from the supply reel to the take-up reel tape 6 is further guided by a guide roller 7.

Reference numeral 10 has been applied to generally indicate an electric motor. Motor 10 includes a first component or stator 12 rotatable relative to frame structure 1 and a second component or rotor 11 arranged coaxially to said first component or stator 12 and rotatable relative to said frame structure and relative to said first component or stator. It will be apparent from the foregoing that the term stator has been applied in a rather unconventional manner to indicate a rotatable component of an electric motor. This term has been applied because of the stator 12 in motor 10 performs electrically the same function a stator or magnet frame performs in a conventional electric motor. Motor 10 is energized by means of slip rings 8 cooperating with brushes 9. Numeral 39 has been applied to indicate the electric circuit for energizing motor 10. Upon energization of motor 10 its stator 12 and rotor 11 rotate in opposite directions relative to frame structure 1 as indicated by arrows in the lower right corner of the drawing. The windings of one of components 11, 12 are short-circuited. These windings may be of the squirrel-cage-type.

Motor component or rotor 11 is supported by a shaft 13 which, in turn, supports a reel support 14. An electromagnetic clutch 15 is interposed between shaft 13 and reel support 14. Clutch 15 includes a pair of brushes 35 cooperating with a pair of slip rings for energizing clutch 15 from the source of current 33. Numeral 36 has been applied to indicate conductors connecting the source of current 33 with brushes 35.

The motor component or rotor 12 is provided with a circumferential groove 17 receiving an endless transmission belt 18. Belt 18 is looped around rotatable transmission disc 19 supported by a shaft 20 mounted in frame structure 1. Shaft 20 drives an electromagnetic clutch 21 by means of which reel support 22 is being driven. Electromagnetic clutch or coupling 21 is provided with slip rings engaged by brushes 37 and can be energized from the source of current 33 by the intermediary of conductors 36.

Reel support 14 supports supply reel 16, and reel support 22 supports take-up reel 23. Supply reel 16 can be driven positively by motor 10 only if clutch or coupling 15 is energized and operative, and take-up reel 23 can be driven by motor 10 only if clutch or coupling 21 is energized and operative.

Numeral 25 has been applied to indicate a rocking-shaft mounted in frame structure 1. Rocking shaft 25 supports a pair of arms 26 each supporting a brake-shoe or brake element 38. Rotor 11 and stator 12 each comprise a substantially cylindrical lateral surface and a pair of plane end surfaces at right angles to the common axis of rotor 11 and stator 12. The lower end surfaces of rotor 11 and stator 12 are adapted to be co-operatively engaged by brakeshoes or brake elements 38. Rocking-shaft 25 has a neutral position wherein both brake elements 38 are out of engagement with the cooperating brake surfaces on rotor 11 and stator 12. Rocking shaft 25 has further two limit positions or brake positions each opposite to said neutral position thereof. In one of these limit positions or brake positions one of brake elements 38 engages and restrains rotor 11 without restraining stator 12, while in the other of these limit positions or brake positions the other of brake elements 38 engages or restrains stator 12 without restraining rotor 11. If rotor 11 is restrained and immobilized stator 12 rotates with increased speed, and vice versa.

Rocking-shaft 25 is provided with an arm 27 for operating a change-over switch including two pairs of cooperating contacts 28 and 29. Numeral 39 has been applied to indicate a source of current for energizing motor 10. The energizing circuit includes in addition to leads 34 and cooperating pairs of contacts 28, 29 a resistor R. In the neutral position of rocking-shaft 25 arm 27 is in a vertical or neutral position and the two pairs of contacts 28, 29 are then unaffected by arm 27 and consequently both in the open position thereof. The energizing circuit of motor 10 then runs from the upper terminal of source 39 through resistor R, one lead 34, motor 10, the other lead 34 back to the lower terminal of source 39. In other words, if and as long as rocking-lever 25 is in its neutral position, motor 10 is operated at a relatively reduced voltage in which case the number of its revolutions per minute is relatively low. If shaft 25 is rocked to either of its two limit or brake positions, then either the pair of contacts 28 or the pair of contacts 29 is closed. To the right of the drawing rocking-shaft 25 is shown in one of its limit positions wherein brake element 38 engages and immobilises rotor 11 and wherein arm 27 closes the two contacts 28. As a result of closing contacts 28 resistor R is shunted out. Consequently the full voltage of source 39, e.g. 220 volt A.C. or D.C., is applied to motor 10. Increase of the operating voltage results in an increase of the number of revolutions of stator 12 relative to frame structure 1 above and beyond the increase of the number of revolutions or speed caused by restraining rotor 11 by one of the brake elements 38. If shaft 25 is rocked through neutral to its opposite brake position stator 12 is restrained by the brake element 38 shown to the right of the drawing and contacts 29 are closed. This results in an increase of the number of revolutions of the rotor 11 relative to frame structure 1 above and beyond the increase of the number of revolutions or speed caused by restraining stator 12 by the brake element 38 shown to the right of the drawing.

Rocking-shaft 25 is further provided with an arm 30 for operating a three-way-change-over-switch including two pairs of cooperating contacts 31, 32. In the neutral position of rocking-shaft 25 arm 30 has no effect upon the above change-over-switch. Consequently both pairs of contacts 31, 32 are closed and the source of current energizes both electromagnetic clutches or couplings 15 and 21. If so energized torques are imparted to both reel supports 14 and 22 and to both reels 16 and 23. If the rocking lever 25 is off neutral, e.g. in the brake of limit position shown in the drawing, arm 30 opens one of contacts 31, 32 resulting in de-energization of clutch or coupling 15 or clutch or coupling 21. In the limit positions or brake positions of rocking shaft 25 one of the clutches 15, 21 is energized and operative, and the other clutch is de-energized and inoperative.

During recording and playback rocking lever 25 is in its neutral position and both clutches or couplings 15, 21 energized and operative. Rotor 11 and stator 12 impart opposite torques to reels 16 and 23 thus maintaining tape 6 stretched or taut. Tape 6 is advanced by the action of capstan 24 and remains taut irrespective of the speed at which it is advanced and moved past the three heads 2, 3, 4.

Rapid foreward or backward operation as required for winding or unwinding at increased speed is effected by throwing rocking-lever 25 out of neutral to either of its limit positions. As a result, the motor component not restrained by the brake action will revolve at an increased speed relative to frame structure 1. This speed increase is due to the fact that rotor 11 and stator 12 rotating in opposite directions normally have a speed of $\pm V$ relative to frame structure 1 and that the speed of one of said components relative to frame structure 1 becomes 2V if the speed of the other of said components is reduced to zero by the action of a brake mechanism. The speed increase is further due to the fact that resistor R is shunted out whenever rocking-lever 25 is shifted out of neutral, resulting in applying an increased voltage to motor 10. When rocking lever 25 is shifted out of neutral to one of its limit positions or brake positions, the reel 16 and 23, respectively, to which no torque is imparted at the time by motor 10 is free to rotate because the respective reel is then uncoupled by one of clutches 15, 21 from the component 11, 12 of the motor 10 which is then restrained by the action of the brake mechanism 25, 26, 38. When rocking-lever 25 is returned to neutral both clutches 15 and 21 are instantly energized, thus maintaining magnetic tape or wire 6 stretched or taut.

It will be understood that I have illustrated and described herein a preferred embodiment of the invention and that various alterations may be made in the details thereof without departing from the spirit and scope of the invention as defined in the appended claims.

I claim as my invention:

1. A magnetic recording and playback system for magnetic tape and magnetic wire comprising a frame structure, a motor including a stator and a coaxial rotor, means for rotatably supporting said stator to allow rotation thereof relative to said frame structure, means for rotatably supporting said rotor to allow rotation thereof relative to said frame structure and relative to said stator; a first electric circuit for energizing said motor; a first reel adapted to be driven by said stator, a second reel adapted to be driven by said rotor; a brake mechanism adapted to be selectively applicable to said stator and to said rotor; a pair of electromagnetic clutches one interposed between said first reel and said stator and the other interposed between said second reel and said rotor; a second electric circuit for energizing said pair of electromagnetic clutches; a first change-over-switch arranged in said first circuit and operatively related to said brake mechanism to change the voltage applied to said motor depending upon the position of said brake mechanism, and a second change-over-switch arranged in said second circuit and operatively related to said brake mechanism to control said pair of clutches jointly with said brake mechanism.

2. A magnetic recording and playback system for magnetic tape and magnetic wire comprising a frame structure, an electric motor including a first component rotatable relative to said frame structure and a second component arranged coaxially to said first component and rotatable relative to said frame structure and relative to said first component; a first reel adapted to be driven by said first component; a second reel adapted to be driven by said second component; selectively operable means for precluding rotation of said first component and of said second component relative to said frame structure to cause rotary movement between said first component and said second component relative to said frame structure at an increased speed; and means for increasing the operating voltage applied to said motor when said motor is operating with said first component and said second component selectively precluded from rotating relative to said frame structure.

3. A magnetic recording and playback system for magnetic tape and magnetic wire comprising a frame structure, an electric motor including a first component rotatable relative to said frame structure and a second component arranged coaxially to said first component and rotatable relative to said frame structure and relative to said first component; a take-up reel adapted to be driven by said first component; a supply-reel adapted to be driven by said second component; a brake mechanism for said motor, said brake mechanism being adapted to have a neutral position wherein said brake mechanism is inoperative, a first brake position wherein said brake mechanism is restraining said first component without restraining said second component, and a second brake position wherein said brake mechanism is restraining said second component without restraining said first component; a first clutch interposed between said take-up reel and said first component; a second clutch interposed between said supply reel and said second component; and clutch control means operatively related to said brake mechanism to maintain said first clutch and said second clutch in operative positions when said brake mechanism is in said neutral position thereof, and to selectively render said first clutch and said second clutch inoperative when said brake-mechanism is in said first brake position and in said second brake position thereof.

4. A magnetic recording and playback system for magnetic tape and magnetic wire comprising a frame structure, a motor including a stator and a rotor, means for rotatably supporting said stator to allow rotation thereof relative to said frame structure, means for rotatably supporting said rotor to allow rotation thereof relative to said frame structure and relative to said stator; a first reel adapted to be driven by said stator; a second reel adapted to be driven by said rotor; a brake mechanism adapted to be applicable to said stator and to said rotor to selectively preclude rotation of said stator and of said rotor relative to said frame structure; a pair of electromagnetic clutches including a first electromagnetic clutch interposed between said first reel and said stator and a second electromagnetic clutch interposed between said second reel and said rotor, an energizing circuit for said pair of electromagnetic clutches; and a three-way-change-over-switch in said circuit adapted to selectively energize said pair of clutches, said first clutch and said second clutch.

5. A magnetic recording and playback system for magnetic tape and magnetic wire comprising a frame structure, an electric motor including a first component rotatable relative to said frame structure and having a substantially cylindrical lateral surface and end surfaces, said motor further including a second component rotatable relative to said frame structure and relative to said first component, said second component having a substantially cylindrical lateral surface and end surfaces, a first reel adapted to be driven by said first component, a second reel adapted to be driven by said second component; a rocking-shaft adapted to have a neutral position and two limit positions each to one side of said neutral position; a pair of brake shoes, one of said pair of brake shoes being adapted to engage one of said end surfaces of said first component and the other of said pair of brake shoes being adapted to engage one of said end surfaces of said second component; means operatively related to said rocking-shaft for selectively causing engagement of one of said pair of brakeshoes with said one of said end surfaces of said first component and with said one of said end surfaces of said second component when said rocking-shaft is moved to said limit positions thereof; a pair of electromagnetic clutches including a first electromagnetic clutch interposed between said first reel and said first component and a second electromagnetic clutch interposed between said second reel and said second component, an energizing circuit for said pair of clutches, and a three-way-change-over-switch in said circuit operatively related to said rocking-shaft to maintain said first clutch and said second clutch simultaneously energized when said rocking-shaft is in said neutral position thereof and to selectively de-energize said first clutch and said second clutch when said rocking-shaft is in said two limit positions thereof.

References Cited in the file of this patent

UNITED STATES PATENTS

| | | |
|---|---|---|
| 516,916 | Coleman | Mar. 20, 1894 |
| 2,730,309 | Baer | Jan. 10, 1956 |
| 2,733,871 | Reinhold | Feb. 7, 1956 |